(12) United States Patent
Thacher

(10) Patent No.: US 7,578,361 B2
(45) Date of Patent: Aug. 25, 2009

(54) DIFFERENTIAL STEERING ASSIST SYSTEM FOR UTILITY VEHICLE

(75) Inventor: Russell James Thacher, Monroe, NC (US)

(73) Assignee: Deere & Company, Moline, IL (US)

( * ) Notice: Subject to any disclaimer, the term of this patent is extended or adjusted under 35 U.S.C. 154(b) by 461 days.

(21) Appl. No.: 11/201,674

(22) Filed: Aug. 11, 2005

(65) Prior Publication Data
US 2007/0051554 A1 Mar. 8, 2007

(51) Int. Cl.
B62D 1/24 (2006.01)
(52) U.S. Cl. ..................................... 180/6.3
(58) Field of Classification Search ............... 180/6.24, 180/6.26, 6.28, 6.3, 197; 701/41, 42, 43
See application file for complete search history.

(56) References Cited
U.S. PATENT DOCUMENTS

| 5,388,658 | A | | 2/1995 | Ando et al. | |
|---|---|---|---|---|---|
| 5,950,748 | A | * | 9/1999 | Matsumoto et al. | 180/6.24 |
| 6,076,626 | A | * | 6/2000 | Bohner et al. | 180/402 |
| 6,135,231 | A | * | 10/2000 | Reed | 180/308 |
| 6,588,858 | B2 | * | 7/2003 | Ritz et al. | 303/140 |
| 7,023,150 | B2 | * | 4/2006 | Hisada et al. | 318/34 |
| 7,357,211 | B2 | * | 4/2008 | Inui | 180/266 |
| 2002/0060103 | A1 | | 5/2002 | Ritz et al. | |
| 2004/0216930 | A1 | * | 11/2004 | Yeh | 180/6.5 |
| 2005/0222739 | A1 | * | 10/2005 | Mori | 701/69 |
| 2007/0144797 | A1 | * | 6/2007 | Tarasinski et al. | 180/6.28 |

FOREIGN PATENT DOCUMENTS

| EP | 0 295 396 | 12/1988 |
|---|---|---|
| EP | 0 863 063 | 9/1998 |

OTHER PUBLICATIONS

European Search Report dated Dec. 5, 2006 (6 pages).

* cited by examiner

Primary Examiner—Tony H. Winner

(57) ABSTRACT

A differential steering assist system is provided for an off road utility vehicle with a pair of steerable front wheels and at least one pair of driven left and right rear wheels. The system uses a steering position sensor and wheel speed sensors that sense the wheel speed of the driven left and right rear wheels. An electronic control unit provides speed reducing commands to the left or right rear wheels based on the sensed steering position and sensed wheel speed.

16 Claims, 6 Drawing Sheets

DIFFERENTIAL STEERING ASSIST SYSTEM FOR UTILITY VEHICLE

FIELD OF THE INVENTION

This invention relates generally to vehicle steering systems, and more specifically to steering systems for off road utility vehicles.

BACKGROUND OF THE INVENTION

Rear-wheel drive off road utility vehicles such as Gator™ vehicles manufactured by Deere & Company of Moline, Ill., routinely haul heavy payloads during normal usage. Such utility vehicles may have poor steering performance if a heavy load is carried by the bed. For example, loaded utility vehicles may tend to "plow" or remain on an existing track, even though the steering wheel has been turned and the front wheels have changed position.

Utility vehicles use automotive steering systems, in which the angles of the front wheels change in proportion to the rotational position of the steering wheel. Utility vehicles, however, have far less mass over the front axle than automobiles. As a result, off road utility vehicles may have poor steering performance while carrying heavy payloads.

A steering system is needed for an off road utility vehicle that will provide good steering performance if a heavy load is added to the bed. A steering system is needed that will reduce or eliminate the tendency of loaded off road utility vehicles to "plow" or remain on an existing track if the steering wheel has been turned and the front wheels have changed position.

SUMMARY OF THE INVENTION

A differential steering assist system is provided for an off road utility vehicle having left and right driven rear wheels, a pair of front wheels, a steering wheel, and a steering linkage connecting the front wheels to the steering wheel. The vehicle's front wheels, steering wheel and steering linkage define a steering geometry position. The steering geometry position and actual speed of the left and right rear wheels are sensed, and an electronic control unit on the vehicle determines if the steering geometry position indicates a vehicle turn, identifies which of the left and right rear wheels is the inner wheel during the vehicle turn, estimates the desired speed of the inner wheel during the vehicle turn, calculates the error between the actual inner wheel speed and the desired inner wheel speed during the vehicle turn, and provides a command to reduce the actual inner wheel speed to approach the desired inner wheel speed during the vehicle turn.

The differential steering assist system provides good steering performance if a heavy load is added to the utility vehicle bed. The system reduces or eliminates the tendency of loaded off road utility vehicles to "plow" or remain on an existing track if the steering wheel has been turned and the front wheels have changed position.

DESCRIPTION OF THE PREFERRED EMBODIMENT

Figure 1:
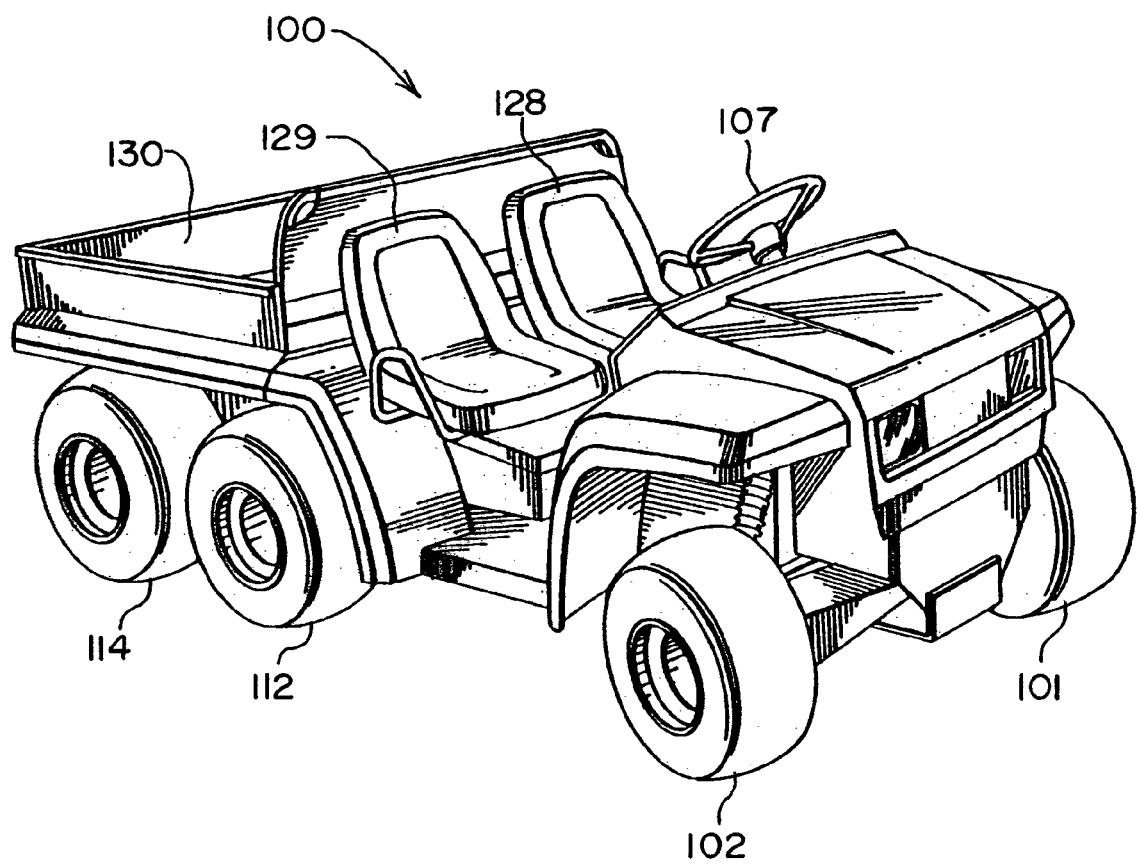
FIG. 1 is a perspective view of a utility vehicle that may use the differential steering assist system according to the present invention.

FIG. 1 shows an off road utility vehicle of the type that may use the differential steering assist system of the present invention. Utility vehicle 100 may have a pair of steerable front wheels 101, 102, and may have a first or forward pair of rear wheels 111, 112, and a second or rearward pair of rear wheels 113, 114. Alternatively, the utility vehicle may have a single pair of rear wheels, as the present invention may be used for either a single rear axle or tandem rear axle vehicle. The utility vehicle also may have one or more operator seats 128, 129 and a rear cargo box 130 located generally over the rear wheel(s).

Figure 2:
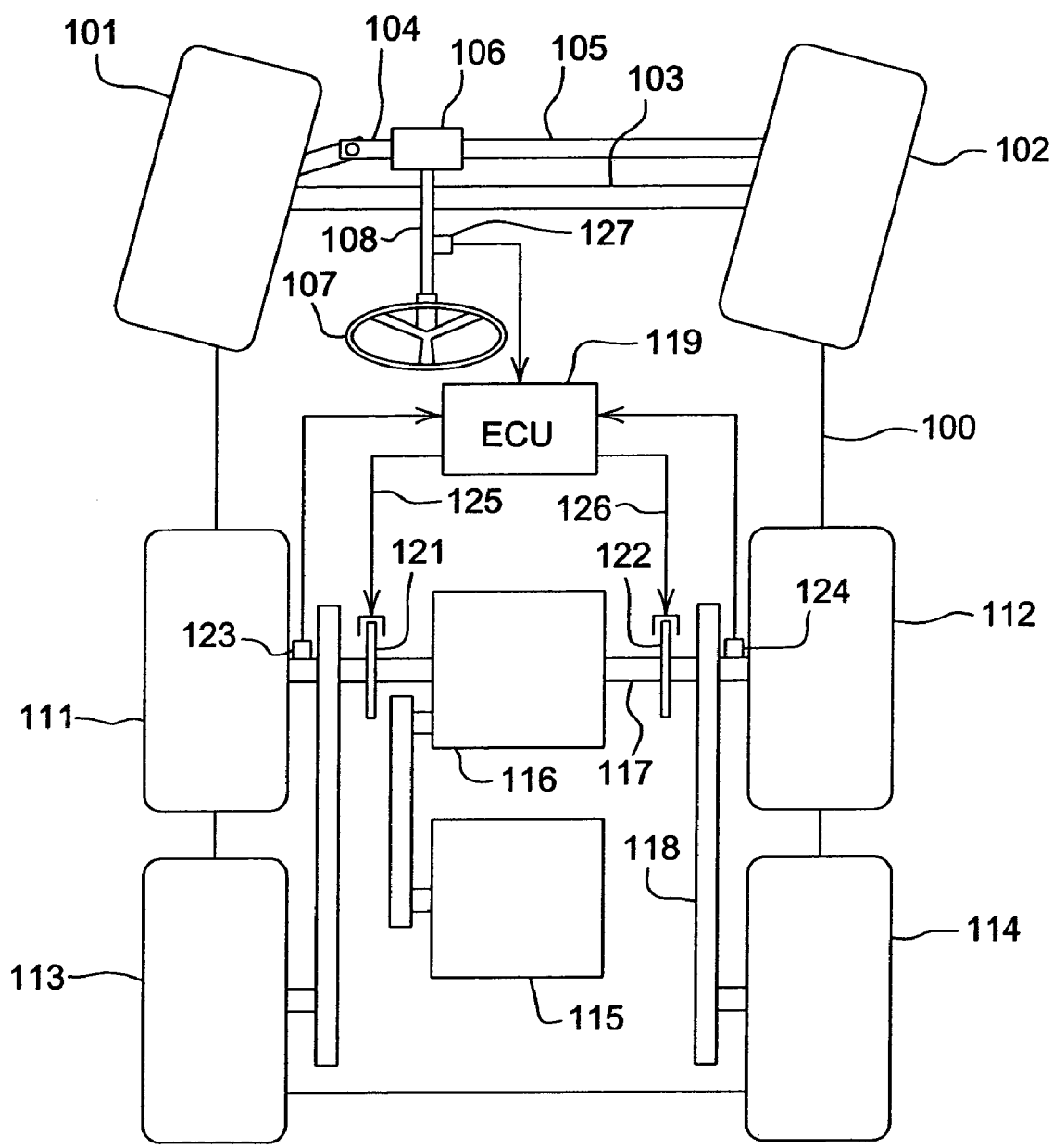
FIG. 2 is a schematic representation of a steering assist configuration according to a first embodiment of the invention.

Now referring to FIG. 2, steerable front wheels 101, 102 may be connected to opposing ends of front axle 103, and through steering linkages 104, 105 to steering control box 106. The steering control box may be any well known mechanical or electrical device that be operated to steer the front wheels using steering wheel 107 on steering wheel shaft 108.

As previously stated, the utility vehicle may have a single pair of rear wheels or two pairs of rear wheels. In the embodiment of FIG. 2, the utility vehicle has a first or forward pair of driven rear wheels 111, 112, and a second or rearward pair of driven rear wheels 113, 114. Engine 115 may be an internal combustion engine or other fuel or electric power source to provide rotational power to drive the rear wheels through transmission or gearcase 116 and rear axle 117. The first or forward pair of driven rear wheels may be interconnected with the second or rearward pair by one or more chains or belts 118.

In one embodiment, the utility vehicle may have on-board sensors that may read vehicle operating parameters including steering geometry position from the steering wheel or steering linkage, accelerator pedal position, and wheel speeds of the left and right driven rear wheels. Information from sensors may be passed to an electronic control unit which modulates either electronic brake actuators (in the embodiment of FIG. 2) or the left/right drive system commands (in the embodiment FIG. 3) to compensate for the commanded instantaneous turning radius of the vehicle.

In the embodiment of FIG. 1, electronic control unit 119 may independently control braking effort to left and right rear wheels 111, 112. When steering geometry position sensor 127 detects a turn is being made, electronic control unit 119 may use feedback regarding the steering wheel position, along with the outside rear wheel speed from speed sensors 123, 124, to continuously determine a desired inside rear wheel speed. Throughout the turn, a closed-loop speed control system may attempt to regulate the actual inside rear wheel speed to approach a desired inside rear wheel speed. This may be accomplished through use of electronic actuators that provide braking commands 125 or 126. The braking commands may independently and variable engage left or right brakes 121, 122 to slow the inside rear wheel(s) during a turn.

Figure 3:
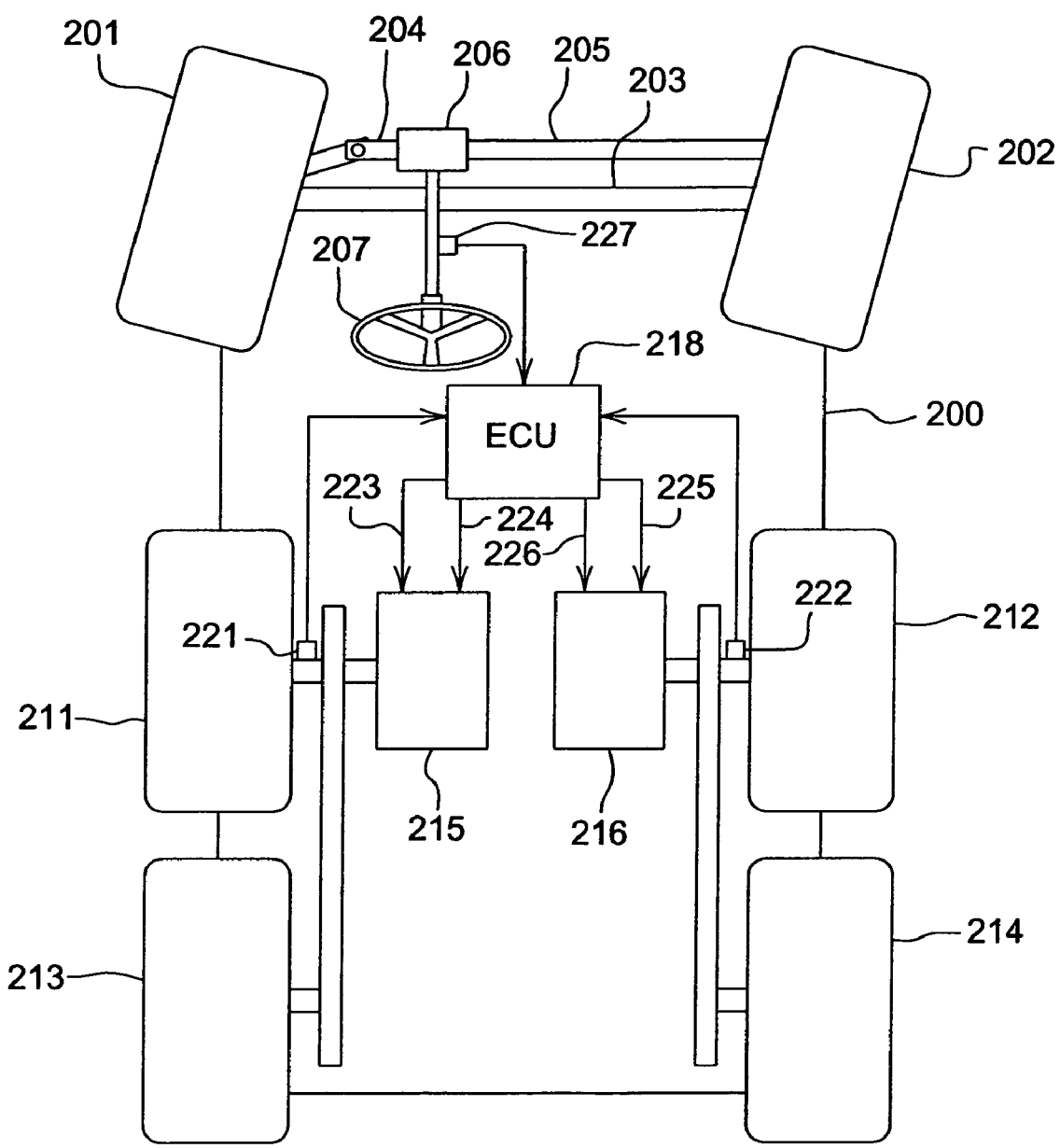
FIG. 3 is a schematic representation of a steering assist configuration according to a second embodiment of the invention.

In a second embodiment shown in FIG. 3, power may be provided independently to left and right rear wheels 211, 212.

For example, power may be provided independently to each of the rear wheels through either electric motors or electronically controlled hydraulic motors. Differential steering assist may be accomplished by reducing the torque and/or speed commands to the inside rear wheel(s) during a turn.

In the second embodiment, utility vehicle 200 may have a pair of steerable front wheels 201, 202 and front axle 203. The front wheels may be connected by steering linkages 204, 205 to steering control box 206 which may be used to turn the front wheels using steering wheel 207 on shaft 208. Additionally, utility vehicle 200 may have one or more pairs of driven rear wheels. For example, the vehicle may have a first or forward pair 211, 212 and a second or rearward pair 213, 214. Motor 215 may drive the left rear wheel(s), and motor 216 may drive the right rear wheel(s). The motors may be hydraulic, in which case they may be connected to a hydraulic pump (not shown) and engine (also not shown). Alternatively, motors 215, 216 may be electric and may be connected to a stored power source.

In the second embodiment, electronic control unit 218 may be connected to steering position sensor 227, and left and right rear wheel wheel speed sensors 221, 222. The electronic control unit may process data from the sensors using a differential steering assist system. The output of the electronic control unit may be independent torque and speed commands to the left drive controller and right drive controller for the left and right rear wheels. Torque and speed commands 223, 224 are for the left drive controller, and torque and speed commands 225, 226 are for the right drive controller.

In the second embodiment, each drive controller may include sensors 221, 222 to measure actual wheel torque and speed, and compare these values with the commands from electronic control unit 218. The drive controllers may operate in closed-loop speed or torque control mode, depending on which of the two parameters (torque or speed) is limiting. For example, if measured torque exceeds the torque command, the drive may operate in torque control mode. However, if actual speed that is measured exceeds the speed command, the drive may operate in speed control mode.

Figure 4:
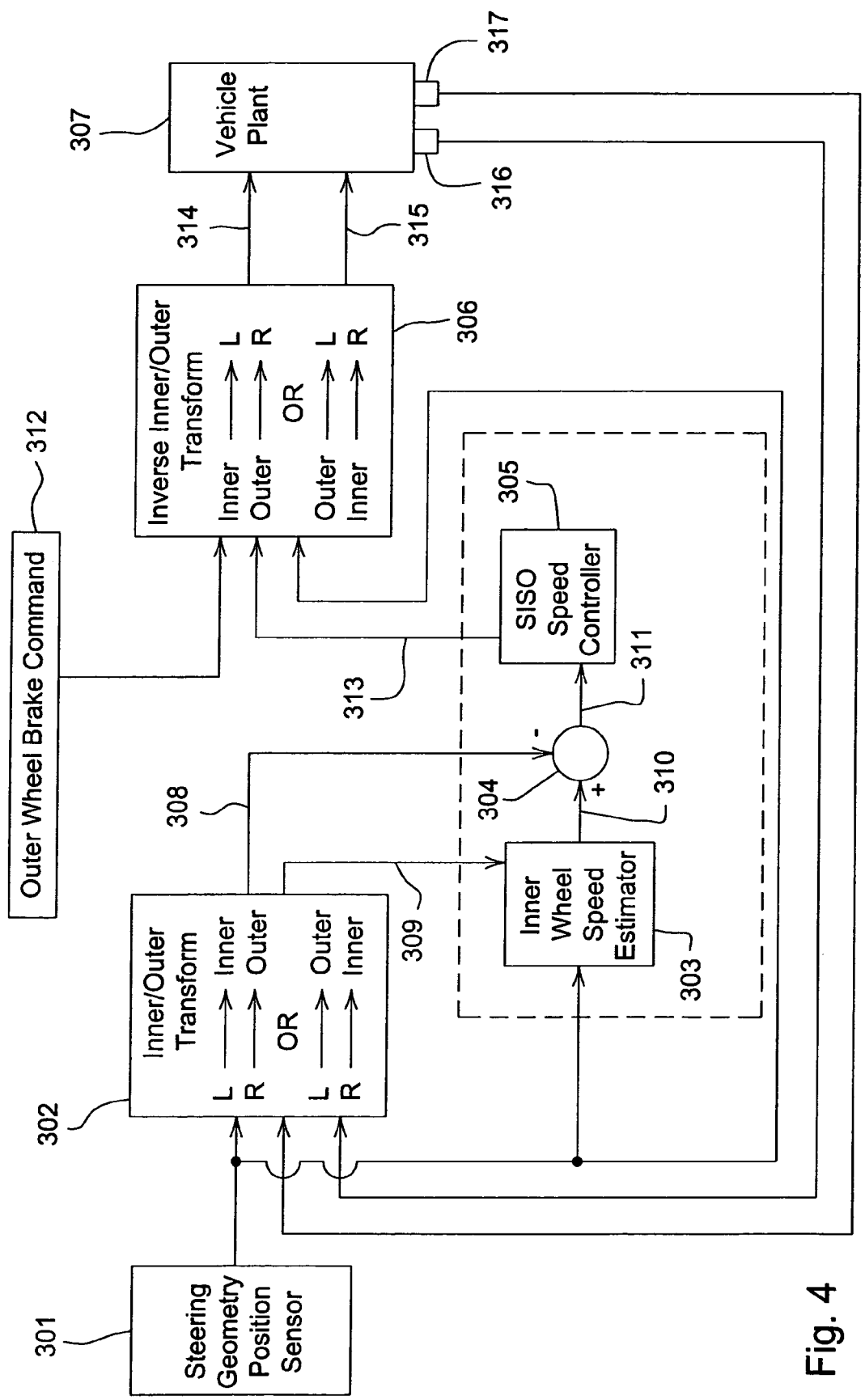
FIG. 4 is a block diagram illustrating a steering assist system that may be used in the first embodiment.

FIG. 4 is a block diagram of a control system that may be used in electronic control unit 119 according to the embodiment of FIG. 2. In block 301, steering geometry position may be sensed from the steering wheel or steering linkage. Block 302 represents an inner/outer transform step, using steering geometry position and speed feedback from sensors 316, 317 for the left and right rear wheels, respectively, to identify the inner wheel and outer wheel in a turn. For example, if the steering geometry position sensor indicates the steering wheel is turned left, the left side wheel(s) are deemed to be the inside set and the right side wheel(s) are the outside set. Block 302 then routes the speed feedback from the left wheel(s) to block 304 as the inner wheel speed feedback and routes the speed feedback from the right wheel(s) to block 303 as the outer wheel speed feedback. The transform block 302 routes the speed feedback signals oppositely if the steering geometry position sensor 301 indicates a right turn. Outputs from block 302 may be inner wheel speed 308 and outer wheel speed 309. In block 303, representing an inner wheel speed estimator step, the desired inner wheel speed may be estimated from steering geometry position and outer wheel speed, using the following set of equations:

$$R = \left(\frac{L}{\delta}\right) + \left[K_{US} \times \left(\frac{V_o^2}{g \times \delta}\right)\right]$$

-continued $$V_i = \frac{(R - B/2) \times V_o}{R + B/2}$$

$$\omega_i = \frac{V_i}{r}$$

$K_{us}$=Understeer coefficient
$\delta$=Steering angle
L=Vehicle wheelbase
B=Vehicle track
R=Turning radius
r=Rolling radius of tire
g=Acceleration due to gravity, 9.81 m/s²
$V_o$=Outside wheel velocity
$V_i$=Inside wheel velocity
$\omega_i$=Inside wheel angular velocity (estimated rotational speed of inside wheel)

Still referring to the embodiment of FIG. 4, in block 304, the error may be calculated between the inner wheel speed command from block 303, and the actual inner wheel speed from block 302. Block 305 represents a speed controller step, which determines how much the inner wheel must be braked to reduce the error at an acceptable level between the inner wheel speed command and actual inner wheel speed, and provides inner wheel brake command 313. Block 306 represents an inverse inner/outer transform step. The inner/outer transform uses steering geometry position 301, the inner wheel brake command 313, and an outer wheel brake command 312 (a constant=0), to provide a left brake command 314 or right brake command 315 during the turn. In block 307, the left and/or right brake commands may be provided to the left and/or right brakes of the vehicle plant.

Figure 5:
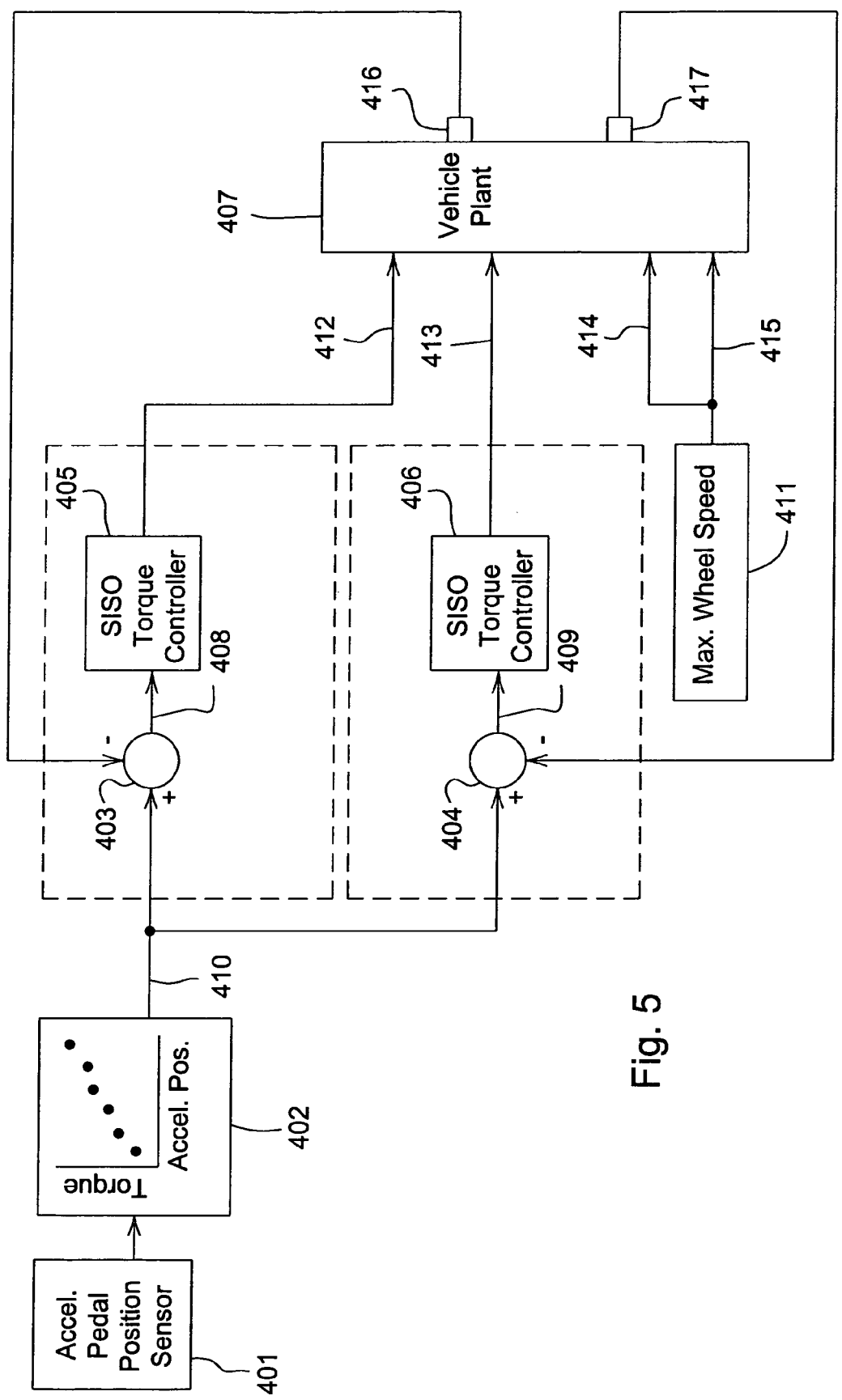
FIG. 5 is a block diagram illustrating the steering assist system that may be used for straight ahead travel in the second embodiment.

According to a second embodiment shown in FIG. 5, when the utility vehicle is driving in a straight line, it may operate in torque control mode for the left and right rear driven wheels. In the torque control mode, the torque command may be directly proportional to accelerator position. Operating in the torque control mode may provide the driver with a feel most similar to that of a typical automobile.

Figure 6:
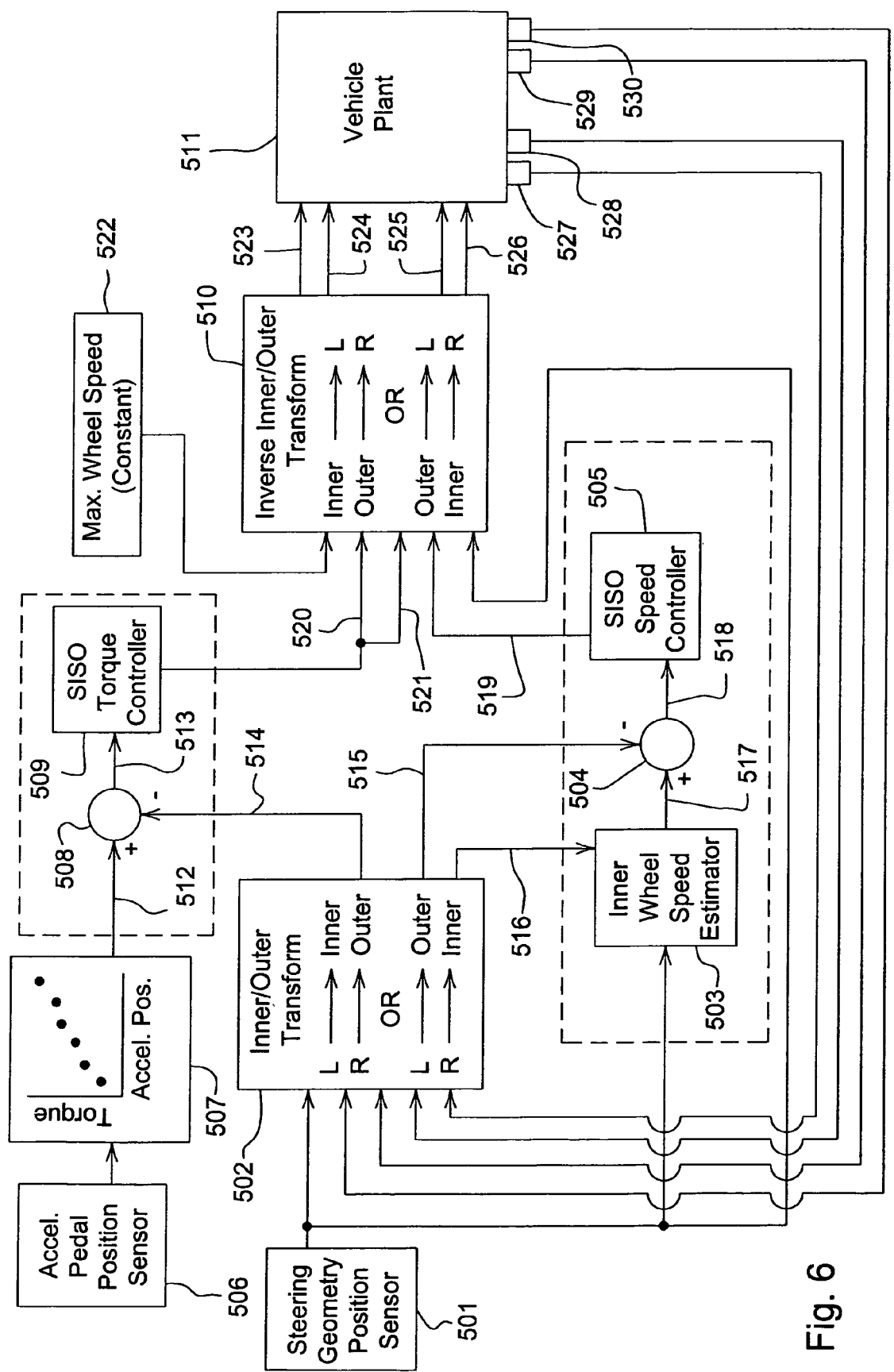
FIG. 6 is a block diagram illustrating the steering assist system that may be used for turns in the second embodiment.

According to the second embodiment shown in FIG. 6, when a turn is sensed at the steering wheel or steering linkage, the differential steering assist system may reduce the speed command to the inside driven wheel(s), depending upon steering wheel angle and the measured speed of the outside wheel(s). During the turn, the inside drive wheel may operate in speed control mode, while the outside drive wheel remains in torque control mode. Once the steering wheel returns to the nominal "straight" position, both drives may return again to torque control mode.

FIG. 5 is a block diagram illustrating the differential steering assist system that may be used with the electronic control unit in the torque control mode of the second embodiment. In block 401, the accelerator pedal position is sensed. In block 402, the accelerator pedal position is mapped to provide a torque command 410. An example of a torque vs. accelerator pedal position mapping is set forth below.

| Pedal Position | Torque Command (%) |
| --- | --- |
| 0 | 0 |
| 63 | 0 |
| 127 | 12.5 |

-continued

| Pedal Position | Torque Command (%) |
|---|---|
| 191 | 25 |
| 255 | 37.5 |
| 319 | 50 |
| 383 | 55 |
| 447 | 60 |
| 511 | 65 |
| 575 | 70 |
| 639 | 75 |
| 703 | 80 |
| 767 | 85 |
| 831 | 90 |
| 895 | 95 |
| 959 | 100 |
| 1023 | 100 |

In block 403, the motor torque error 408 for the left rear wheel(s) is calculated. The left wheel motor torque error may be the difference between motor torque command 410 and the actual left rear wheel torque feedback from left wheel sensor 416. Similarly, in block 404, the right wheel motor torque error 409 is calculated as the difference between the motor torque command and the actual right rear wheel torque feedback from right wheel sensor 417. Block 405 represents a torque controller step which provides a left wheel torque command 412 to change the left wheel motor torque at an acceptable rate to reduce the error between the motor torque command and actual left motor torque. Block 406 represents a torque controller step which provides a right wheel torque command 413 to change the right wheel motor torque at an acceptable rate to reduce the error between the motor torque command and actual right motor torque. The output of blocks 405 and 406 are left and right wheel torque commands 412, 413 respectively. In block 407, the left and right torque commands are provided to the left and right rear wheel motors of the vehicle plant, along with left and right wheel speed commands 414, 415 which in torque control mode may be a predetermined maximum wheel speed limit 411 (a constant).

FIG. 6 is a block diagram that illustrates the differential steering assist system that may be used when the vehicle is being turned, using the electronic control unit of the second embodiment. In block 501, steering geometry position may be sensed from the steering wheel and/or steering linkage. Block 502 represents an inner/outer transform step, using steering geometry position, torque and speed feedback sensed from the left rear wheel 527, 528 and the right rear wheel 529, 530, to identify the inner and outer wheels during a turn. Outputs from block 502 may be inner wheel speed 515, outer wheel speed 516, and outer motor torque 514. Block 503 represents an inner wheel speed estimator step, which estimates desired inner wheel speed 517 from steering geometry position and outer wheel speed using the set of equations described above for the first embodiment.

Still referring to FIG. 6, in block 504, the error 518 is calculated between the inner wheel speed command from block 503, and actual inner wheel speed from block 502. Block 505 represents a speed controller step, which provides an inner wheel speed command 519 for how to decrease the inner wheel speed at an acceptable rate to reduce the error between the inner wheel speed command and actual inner wheel speed.

As shown in FIG. 6, in block 506, the accelerator pedal position is sensed. In block 507, the accelerator pedal position may be mapped to provide a corresponding torque command 512. In block 508, motor torque error 513 is calculated, which may be the difference between the torque command 512 and the actual outer motor torque 514 from block 502. Block 509 represents a torque controller step which provides outer and inner motor torque commands 520, 521 to reduce the error between the torque command and actual outer motor torque.

In FIG. 6, block 510 represents an inverse inner/outer transform step, which uses steering geometry position, the inner and outer motor torque commands 520, 521, the inner wheel speed command 519, and the maximum wheel speed 522 (a constant), to identify left and/or right torque and speed commands during the turn. The left torque and speed commands 523, 524 and right torque and speed commands 525, 526 may be provided to the left and right rear wheel motors of the vehicle plant 511.

Although the present invention in a preferred embodiment is for use with an off-road utility vehicle, it also could be used in a grass mowing vehicle where scuffing the turf may be a problem.

Having described the preferred embodiment, it will become apparent that various modifications can be made without departing from the scope of the invention as defined in the accompanying claims.

The invention claimed is:

1. An apparatus comprising:
a vehicle having a pair of non-driven steerable front wheels and at least one pair of driven left and right rear wheels;
a pair of hydraulic motors powering the pair of rear wheels;
a steering position sensor;
wheel speed sensors that sense the wheel speed of the left and right rear wheels; and
an electronic control unit determining which of the rear wheels is the inside rear wheel during a turn and providing a speed reducing command to only the hydraulic motor for the inside rear wheel and a torque command to the other of the hydraulic motors based on the sensed steering position and sensed wheel speed.

2. The apparatus of claim 1 wherein the speed reducing signal from the electronic control unit is a brake command to the left or right rear wheels.

3. The apparatus of claim 1 further comprising an accelerator position sensor to provide the accelerator pedal position to the electronic control unit.

4. The apparatus of claim 3 wherein the accelerator position is mapped to a corresponding torque command.

5. An apparatus comprising:
a vehicle having an accelerator, left and right driven rear wheels, left and right hydraulic motors driving the rear wheels, left and right drive controllers, a pair of non-driven front wheels, a steering wheel, a steering linkage connecting the front wheels to the steering wheel; the front wheels, steering wheel and steering linkage defining a steering geometry position;
a plurality of sensors detecting the steering geometry position and the actual speed of the left and right rear wheels; and
an electronic control unit on the vehicle receiving the steering geometry position and actual speed from the plurality of sensors, determining if the steering geometry position indicates a vehicle turn, identifying which of the left and right rear wheels is the inner wheel during the vehicle turn, estimating the desired speed of the inner wheel during the vehicle turn, calculating the error between the actual inner wheel speed and the desired inner wheel speed during the vehicle turn, and providing a command to one of the hydraulic motors to reduce the actual inner wheel speed to approach the desired inner wheel speed during the vehicle turn while providing the hydraulic motor for the other rear wheel with a torque command proportional to the accelerator position.

6. The apparatus of claim 5 further comprising a second pair of left and right driven rear wheels.

7. The apparatus of claim 5 wherein the command to reduce the actual inner wheel speed is a braking command.

8. The apparatus of claim 5 wherein the command to reduce the actual inner wheel speed is a command to reduce the torque to the inner wheel.

9. The apparatus of claim 5 further comprising a sensor to detect the position of the accelerator pedal.

10. The apparatus of claim 9 wherein the electronic control module maps the accelerator pedal position to a torque command.

11. A method comprising:

sensing a steering geometry position of a rear-wheel drive vehicle;

sensing an actual speed of the left and right rear wheels of the vehicle;

identifying which of the left and right rear wheels is an inner wheel during a vehicle turn;

determining a desired speed for the inner wheel during the vehicle turn;

calculating an error between the desired speed and the actual speed of the inner wheel;

reducing the actual speed of a hydraulic motor driving the inner wheel toward the desired speed; and providing a torque command to the hydraulic motor driving the other rear wheel.

12. The method of claim 11 further comprising sensing the accelerator pedal position.

13. The method of claim 12 further comprising mapping the accelerator pedal position to a torque command.

14. The method of claim 13 further comprising sensing the actual torque at the left and right rear wheels.

15. The method of claim 14 further comprising calculating the error between the actual torque of the left and right rear wheels and the torque command.

16. The method of claim 15 further comprising reducing the actual torque of the left and right rear wheels toward the desired torque.

\* \* \* \* \*